United States Patent [19]

Witzke et al.

[11] 4,061,035
[45] Dec. 6, 1977

[54] DIAPHRAGM ARRANGEMENT FOR PRESSURE TRANSDUCERS

[75] Inventors: Günther Witzke, Seuzach; Hans Ulrich Baumgartner, Winterthur, both of Switzerland

[73] Assignee: Kistler Instrumente AG, Winterthur, Switzerland

[21] Appl. No.: 630,515

[22] Filed: Nov. 10, 1975

[30] Foreign Application Priority Data

Nov. 8, 1974 Switzerland ............ 014967/74

[51] Int. Cl.$^2$ .............................................. G01L 7/08
[52] U.S. Cl. .......................... 73/406; 73/398 AR
[58] Field of Search ............... 73/393, 406, 407 R, 73/398 AR, 408, 88.5 SD; 92/1, 104, 105; 338/4

[56] References Cited

U.S. PATENT DOCUMENTS

| 2,872,813 | 2/1959 | Lovelace | 338/4 |
| 3,024,649 | 3/1962 | Taber | 73/406 |
| 3,341,795 | 9/1967 | Newman et al. | 73/88.5 SD |

*Primary Examiner*—Donald O. Woodiel
*Attorney, Agent, or Firm*—Craig and Antonelli

[57] ABSTRACT

A diaphragm arrangement for a pressure transducer, particularly one employed in monitoring an internal combustion engine and employing a force measuring transducer element abuts either against the pressure transducer directly or a preload element coupled therewith. The diaphragm arrangement includes a plurality of ring-shaped portions, one coupled to a preload volt element and another at the periphery of the transducer. Between these inner and outer portions of the diaphragm arrangement is an elastic portion interconnecting the two which permits the transducer to accurately monitor the pressure behavior, without the introduction of errors due to temperature shocks acting on the diaphragm during the measurement.

25 Claims, 9 Drawing Figures

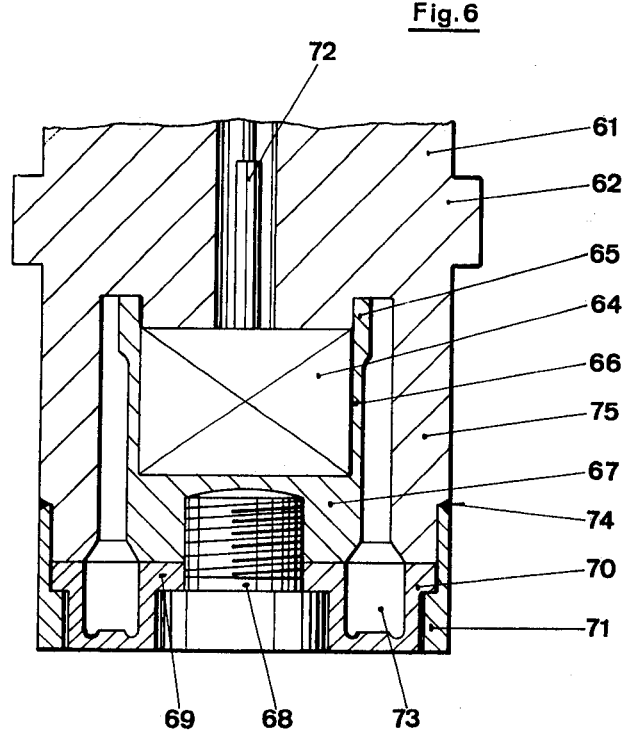
Fig. 6
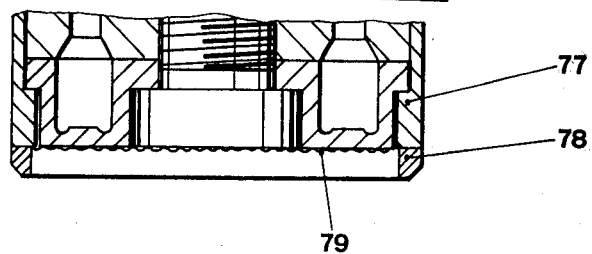
Fig. 7
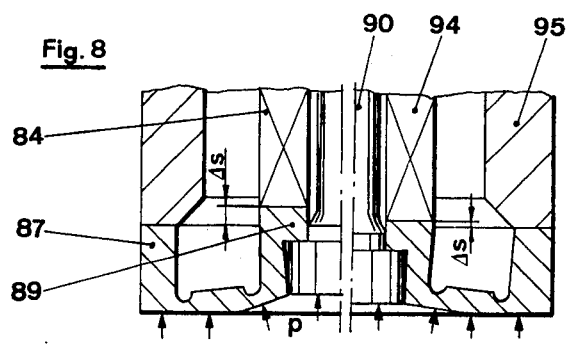
Fig. 8
Fig. 9

DIAPHRAGM ARRANGEMENT FOR PRESSURE TRANSDUCERS

BACKGROUND OF THE INVENTION

The diaphragm of a pressure transducer is its most crucial part and yet is exposed to the most arduous conditions. Pressure transducers are employed for measuring pressure changes in internal combustion engines, turbines, hydraulic and ballistic systems, rockets, explosive forming machines etc. Gaseous or liquid media, with their frequently changing temperature and pressure, act on the diaphragm, which has to transmit the resulting force onto a mechano-electric transducer element. This element may be piezoelectric, inductive, resistive, piezoresistive, or capacitive in its action. This element is then linked by a cable to electronic amplifiers or bridges, whose output signals are supplied into cathode-ray oscillographs, magnetic tape recorders or electronic recorders.

Because the diaphragm is often exposed simultaneously to rapid temperature and pressure shocks, under continuous operation it must withstand very severe mechanical stressing. In addition, highly corrosive gases are present due to the sulphur content of fuels. In a typical design, the diaphragm is welded to the supporting surface on the body of the transducer, but this has the further disadvantage that the weld is close to the parts of the diaphragm which have to sustain the severest stresses. As a result, fatigue fractures occur, especially in the immediate proximity of the welds, assisted in part by recrystallization process. Temperature shocks, such as those imposed by the propagation of the flame front in internal combustion engines, cause internal thermal expansion, which lead to spurious signals that are superimposed upon the pressure signal. The design of the diaphragm part of such pressure transducers therefore involves a number of requirements which are difficult to reconcile, and this is one reason why the solutions achieved up to now have been less than satisfactory.

BRIEF SUMMARY OF THE INVENTION

The purpose of the invention is to enable a pressure transducer to be constructed having a stable calibration factor and allowing exact measurements to be performed over a long period of time. In particular, however, the diaphragm arrangement according to the invention enables the pressure behavior to be measured without errors due to temperature shocks acting on the diaphragm part during measurement. The new diaphragm arrangement will also cause no alteration in the sensitivity of the transducer due to deposits of combustion residues in the course of continuous operation. The design of the proposed diaphragm arrangement transfers the necessary welded joints from the critical zones where high alternating stresses occur to zones where less mechanical strength is required, so that a pressure transducer suitable for continuous operation is achieved, such as for, monitoring duties on internal combustion engines etc.

BRIEF DESCRIPTION OF THE DRAWINGS

FIG. 6 is a cross section through a diaphragm arrangement according to the invention with a disk-shaped force measuring element;

FIG. 7 is a cross section of a diaphragm arrangement according to the invention with additional flame protection;

FIGS. 8 and 9 show cross sectional views of diaphragm arrangements according to the invention with an excessively elastic force measuring cell, and with admissible deformation of the force measuring cell, respectively.

DETAILED DESCRIPTION

The invention is not limited to any particular force measuring element. This may be piezoelectric, piezoresistive, strain gauge or any other ohmic, inductive or capacitive system.

Figure 1:
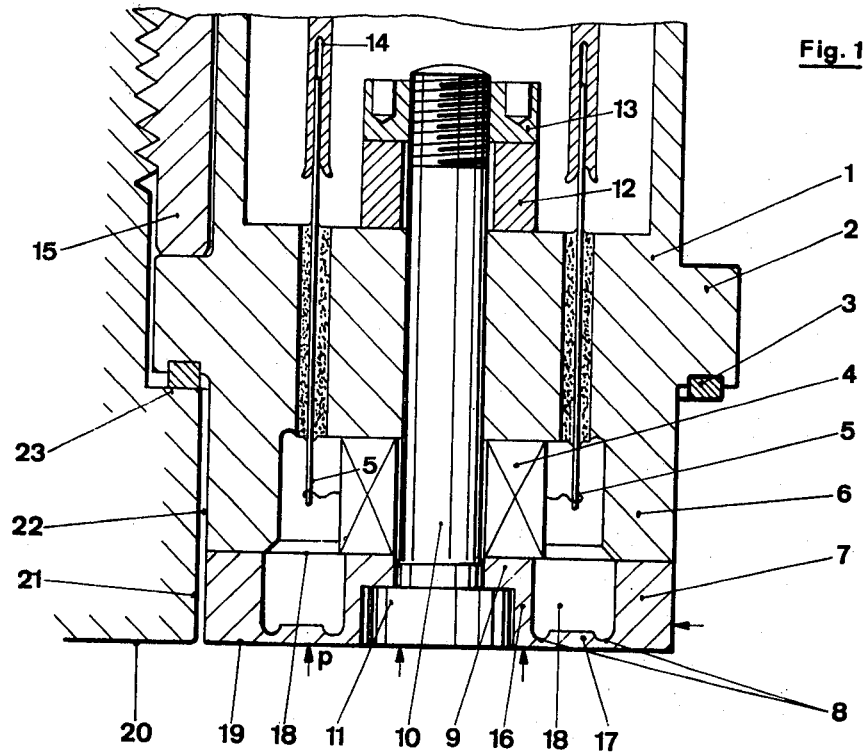
FIG. 1 is a cross section of a diaphragm arrangement according to the invention with an annular force measuring element.

As is shown in FIG. 1, a pressure transducer with a diaphragm arrangement according to the invention consists of a transducer body 1 with a mounting flange 2 and sealing ring 3. Here, the force measuring element 4 has an annular shape. The appropriate electrical connections are joined to the insulated pins 5 passing through the body 1 and leading to the signal outputs 14. The disk-shaped force measuring element 4 and the annular extension 6 of the body 1 are matched so that their end faces lie in a common plane 18. In cross section, the diaphragm arrangement according to the invention represents a double bridge, characterized by a thrust ring 7 joined rigidly to the annular extension 6 by known means and a central ring 9 joined to the supporting ring 16. The annular plate diaphragm 17 is attached to the inner and outer supporting rings 16 and 7 through elastic members 8. The supporting surfaces of rings 9 and 7 also lie in a common plane 18. To provide a tight connection without a gap spring between force measuring element 4, body 1 and central ring 9, the bolt 10 with head 11 is arranged so that this measuring system can be preloaded optimally on the assembled pressure transducer by tightening the nut 13. This nut 13 is braced on a thermal expansion compensating ring 12, which is made of suitable material to ensure that the adjusted preload remains constant within the temperature range of the pressure transducer. Such compensation is necessary, because in many cases the thermal expansion values of the force measuring element 4 differ from the corresponding values of the body 1, diaphragm part 9 and preload bolt 10. Especially where force measuring elements 4 consisting of crystals are used, as in piezoelectric or piezoresistive elements, with lower coefficients of thermal expansion than commercial structural steels, a compensating ring 12 made from a physical steel with a high nickel content is preferably used. Such steels with widely graded coefficients of expansion are available commercially and are easily machined.

An essential feature of the invention is that the diaphragm is flexible and elastic, yet is very strong. Moreover, no preload must be transmitted by the plate diaphragm 17 from the outer thrust ring 7 onto the central ring 9. If there is any residual preload, any temperature change acting on the diaphragm surface 19 will cause a change in the preload acting on the measuring element 4, leading to an error.

The fixed connection between the annular parts 6 and 7, which is usually achieved by welding, inevitably imposes a preload on the diaphragm part 9 which can be measured with the force measuring element 4 during the welding operation. According to the invention, this preload imposed on the diaphragm by micro-deformation during welding on the outer ring is compensated by additionally preloading the inner clamp ring 9 by means of the bolt 10. In this way, the plate diaphragm 17 can be restored to its preloadless state. The optimal preload to be adjusted with the nut 13 is determined by trial and error. Immersion tests in baths of different temperature have proved to be simplest. Once the neutral stress state of the diaphragm is obtained, i.e. the optimal preload of bolt 10 is found, the smallest error signals are given by the pressure transducer when the diaphragm surface 19 is immersed in a liquid at higher temperature, for example. The temperature sensitivity can thus be varied within wide limits by directly adjusting the preload of the assembled transducer, a facility which is directly associated with the diaphragm arrangement according to this invention.

The pressure transducer is fitted to internal combustion engines, for example, in such a way that the hole 21 and seating surface 23 are dimensioned such that after tightening the mounting nipple 15, the combustion chamber surface 20 and the diaphragm surface 19 lie in the same plane. This ensures that no detrimental deposits form on the diaphragm surface 19 owing to combustion residues during prolonged periods of operation. Once the diaphragm surface 19 is set back from the combustion chamber surface 20, reliable continuous operation is no longer assured because combustion residues are no longer removed by the flame front. Over the course of time, the annular gap 22 between the pressure transducer and the mounting hole will become filled with combustion residues. Due to the high rigidity of the outside walls 6 and 7, however, such fouling affects the sensitivity of the pressure transducer only to a very small degree. A further purpose of the diaphragm arrangement according to the invention is the preselected matching of the elasticity of the central supporting system consisting of force measuring element 4, central ring 9 and preload bolt 10 to the outer supporting system consisting of the annular members 6 and 7. As a result, there is no distortion under the effect of pressure 'p', and hence the lowest possible deformation of the surface 19, amounting to only fractions of a micron over the full range of the pressure transducer. This ensures that the elastic members 8 are not overstressed and withstand continuous operation. Further adaptation possibilities are described with reference to FIG. 4.

Figures 2, 3:
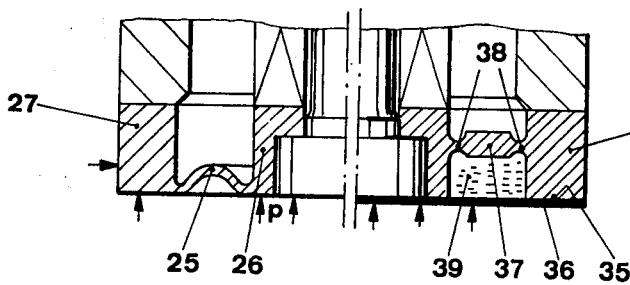
FIGS. 2 and 3 depict cross-sectional views of variants of the diaphragm arrangement according to the invention.

FIG. 2 shows a variant of the diaphragm arrangement according to the invention as shown in FIG. 1. Instead of the annular plate diaphragm, an elastic concave diaphragm 25 is arranged between the outer ring 27 and the inner supporting ring 26. It can be produced by form-turning or by rolling-in from a flat diaphragm. All other features of the invention are retained as described with reference to FIG. 1.

FIG. 3 shows another variant of FIG. 1. Here the plate diaphragm 37 is set back and provided with an annular recess in its outer surface, the resulting space being filled with a pressure transmitting fluid 39, preferably silicone oil, gel or some high-temperature oil and sealed with a thin metal foil. The metal film 36 is joined to the annulus 34 by familiar welding methods at the flange part 35. The elastic connections 38 joining the plate diaphragm 37 to the inner and outer annular members are provided with radial recesses, in order to minimize the notch effect and to ensure a long life. The metal foil 36 is exposed to virtually no mechanical tensile or flexural loads, because it serves only as a pressure transfer medium. All other features of the invention are retained as described with reference to FIG. 1. The diaphragm 37 has practically complete protection from the effects of flame and temperature.

Figures 4, 5:
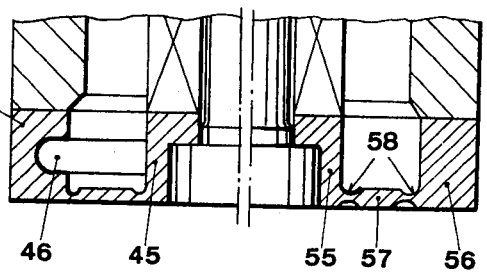
FIGS. 4 and 5 illustrate cross-sectional views of other variants of the diaphragm part according to FIG. 1.

FIG. 4 shows another variant of FIG. 1. The elasticity of the outer ring 47 of the diaphragm arrangement can be adapted roughly to that of the inner supporting ring 45 in simple fashion by means of the recess 46 in the diaphragm arrangement according to the invention.

FIG. 5 shows a further variant of FIG. 1. The plate diaphragm 57 is joined to the outer ring 56 and inner supporting ring 55 by the elastic members 58, which have radial recesses inside and outside to minimize the notch effect and thus ensure a long life. These radial recesses are preferably polished in order to preclude all risks of cracking. All other features are retained as described with reference to FIG. 1.

FIG. 6 shows another embodiment of the diaphragm arrangement according to the invention. The transducer body 61 is again provided with a mounting flange 62. Instead of the annular shape, the force measuring element 64 is disk-shaped and is fitted in a sleeve 67, which is connected via a thin, elastically preloaded wall 66 with the welding flange 65 which, in turn, is joined rigidly to the housing 61 by known means. The signal output 72 can now be effected centrally. The force measuring element 64 is thus fitted under mechanical preload, and the screw 68 tightens the inner ring 69 of the diaphragm arrangement firmly against the sleeve 67. By means of the sleeve 71, whose upper end 74 is welded under preload to the housing 61, the outside ring 70 is forced firmly onto the housing annulus 75 to effect a seal. If necessary, the cavity 73 may be filled with a coolant, which is either enclosed or circulated. As in FIG. 1, the cross section of the diaphragm arrangement again constitutes a double bridge, with the difference that here the diaphragm is joined to the force measuring element 64 and body 61 by purely mechanical means.

FIG. 7 shows a variant of FIG. 6 with the diaphragm surface covered by a thin, elastic metal foil 79 as a protection against the action of flame and heat, this foil being joined to the sleeve 77 by a ring 78. The metal foil 79 may have annular corrugations to give it high flexibility.

FIG. 8 shows a diaphragm arrangement according to the invention in which a force measuring cell 84 with inadequate stiffness has been adopted. The deformation $\Delta S$ under the pressure load 'p' is so great that the elastic limit of the joining members is exceeded.

FIG. 9 shows the same example as in FIG. 8 with a stiffer force measuring cell 94 employed, its elasticity matched to the outer wall 95 and the bolt 90. The remaining deformation $\Delta S$ is no more than a few microns.

The figures and description above relate to a diaphragm arrangement which is based on new knowledge and enables pressure transducers to be constructed, which, for the first time, may be employed for monitoring duties, as in internal combustion engines for instance. The new diaphragm arrangement should also find use in research, however, for applications where all influence on the pressure measurement by changes in the temperature of the medium being measured must be eliminated. Through simple geometry and the ability to machine the diaphragm part separately from the remainder of the transducer, but above all, due to the fact that the contact surfaces of the diaphragm and transducer part lie in the same plane, which can be machined to high accuracy with the known techniques of precision engineering, the arrangement according to the invention assures exactly defined supporting conditions. By adopting a very rigid force measuring cell and prior adaptation of the elasticities of the inner and outer supporting parts, deformation of the diaphragm arrangement according to the invention can be kept to a minimum of typically less than 1 micron under maximum load, making possible the long service life demanded. Particularly important, however, is that the preload of the diaphragm arrangement can be adjusted to the optimal value on the assembled pressure transducer, so that no residual stresses are left in the diaphragm parts and, therefore, no errors can arise due to variation of the preload. A diaphragm suddenly exposed to heat trends to bulge out on the hot side because the impinging heat wave has a temperature gradient normal to the diaphragm surface. The outer layers of the diaphragm facing the heat are already heated and expanded shortly after the first exposure to the heat, whereas the inner layers are still cold. This leads to a distortion of the diaphragm and the imposition of a force via the ring 9 onto the measuring element 4, which is registered as a spurious measurement. The double-jointed support with the elastic elements 8 allows the diaphragm to deform under temperature shock without transmitting forces to the force transducer element 4. In this way heat shock errors are avoided. This combination of various measures yields a pressure transducer which responds only to pressure changes and not to temperature changes accompanying these, thereby achieving a solution which has long been sought. Such intricate diaphragm forms can be achieved particularly well with the transducer design shown in this patent, using the diaphragm geometries illustrated.

We claim:

1. A diaphragm arrangement for a pressure transducer especially for use in monitoring an internal combustion engine, said transducer having a force measuring transducer element, said diaphragm arrangement comprising:
   an outer ring portion;
   an inner ring portion;
   an elastic portion interconnecting said outer ring portion to said inner ring portion;
   at least each of the inner and outer ring portions of said diaphragm arrangement forming a first surface coplanar with a surface by way of which said pressure transducer is mounted for measuring an input force applied thereto, and the inner ring portion having a second surface which provides support for said transducer element; and
   means, coupled to said force measuring transducer element and said inner ring portion, for applying a preload to said force measuring transducer element.

2. A diaphragm arrangement according to claim 1, wherein said preload applying means comprises an adjustable bolt element for adjusting the degree of preload to be applied to said force measuring transducer element.

3. A diaphragm arrangement according to claim 2, wherein said elastic portion comprises a plate diaphragm member connected with said inner and outer portions by elastic joining elements having cross sections which are semicircular.

4. A diaphragm arrangement according to claim 3, wherein said adjustable bolt element has a head forming a portion of and coplanar with said first surface.

5. A diaphragm arrangement according to claim 4, wherein said adjustable bolt element passes centrally through said force measuring transducer element and wherein said preload applying means further comprises a compensating disc coupled to said bolt element, for maintaining the degree of preload constant irrespective of changes in the temperature of said transducer.

6. A diaphragm arrangement according to claim 5, wherein said elastic portion is provided with a surface coplanar with the first surface of said inner and outer ring portions.

7. A diaphragm arrangement according to claim 5, wherein said plate diaphragm member is displaced from said first surface and said elastic means further comprises a temperature-resistant fluid disposed between said displaced plate diaphragm member and said first surface at which a protective metal foil is provided.

8. A diaphragm arrangement according to claim 2, wherein said preload applying means comprises an adjustable bolt element for adjusting the degree of preload to be applied to said force measuring transducer element, said bolt having a head forming a portion of and coplanar with said first surface, wherein said adjustable bolt element passes centrally through said force measuring transducer element and wherein said preload applying means further comprises a compensating disc coupled to said bolt element, for maintaining the degree of preload constant irrespective of changes in the temperature of said transducer, and wherein said elastic portion comprises an elastic arched portion interconnecting said inner and outer ring portions.

9. A diaphragm arrangement according to claim 2, wherein the longitudinal elasticity of said outer ring portion corresponds to that of said inner ring portion.

10. A diaphragm arrangement according to claim 9, wherein a radial recess is provided in said outer ring portion.

11. A diaphragm arrangement according to claim 1, wherein the longitudinal elasticity of said outer ring portion corresponds to that of said inner ring portion.

12. A diaphragm arrangement according to claim 11, wherein a radial recess is provided in said outer ring portion.

13. A diaphragm arrangement according to claim 1, wherein said elastic portion comprises an annular plate diaphragm member connected with said inner and outer portions by elastic joining elements, said elastic portion having a surface coplanar with the first surface of the inner and outer ring portions.

14. A diaphragm arrangement for a pressure transducer, especially for use in monitoring an internal combustion engine, said transducer having an annular housing into which is fitted a force measuring transducer element and a preload sleeve element associated therewith, said diaphragm arrangement comprising:
   an outer ring portion;
   an inner ring portion;
   an elastic portion interconnecting said outer ring portion to said inner ring portion;

at least each of the inner and outer ring portions of said diaphragm arrangement forming a first surface coplanar with a surface by way of which said pressure transducer is mounted for measuring an input force applied thereto, and the inner ring portion having a second surface which abuts said preload sleeve element;

means, coupled to said preload sleeve element and said inner ring portion, for applying a preload to said force measuring transducer element, said preload applying means comprising an adjustable screw threaded in said preload sleeve element; and a preload sleeve surrounding said outer ring portion and forcing said outer ring portion against said annular housing.

15. A diaphragm arrangement according to claim 12, further comprising an annular ring and thin corrugated foil element disposed on said second surface, said foil element held between said preload sleeve and said annular ring.

16. Diaphragm arrangement for pressure transducers in particular for monitoring internal combustion engines, characterized by a diaphragm mounting surface lying in the same plane as a diaphragm pressure transmission surface, the diaphragm arrangement including an outer ring and an inner ring with the diaphragm therebetween and joined in one piece to the rings by elastic means forming the supports of a bridge-like connection, and the support of the inner ring on a force measuring element being adjustable with preloading means.

17. Diaphragm arrangement for pressure transducers according to claim 16, characterized by the preloading means including a bolt, the preload of the bolt being adjustable after assembling the diaphragm arrangement to the optimal value at which the internal preload moments of the diaphragm is fully compensated.

18. Diaphragm arrangement for pressure transducers according to claim 17, characterized by the head of the preload bolt forming part of the diaphragm surface.

19. Diaphragm arrangement for pressure transducers according to claim 17, characterized by the preload bolt passing centrally through the force measuring element and being preloaded through a compensating disk so that the amount of preload is constant throughout the operating temperature range of the transducer.

20. Diaphragm arrangement for pressure transducers according to claim 16, characterized by the diaphragm being in the form of a plate diaphragm connected with the inner and outer rings by means of elastic joining members being delimited by semicircular surfaces on at least one side so that the arrangement resembles two bridge arches in cross section.

21. Diaphragm arrangement for pressure transducers according to claim 16, characterized by the elastic means between outer ring and inner ring consisting of a highly elastic arched bulge produced by pecision machining or cold rolling.

22. Diaphragm arrangement for pressure transducers according to claim 16, characterized by the diaphragm including a plate member being set back between the rings with a temperature-resistant fluid arranged in front of the plate member for pressure transmission and protected by a metal foil.

23. Diaphragm arrangement for pressure transducers according to claim 16, characterized by the longitudinal elasticity of the outer ring being adaptable to that of the inner ring by a radial recess in the outer ring.

24. Diaphragm arrangement for pressure transducers according to claim 16, characterized by a central screw pressing it onto the bottom of a preload sleeve and a further preload sleeve pressing its outside diameter onto an annular housing.

25. Diaphragm arrangement for pressure transducers according to claim 16, characterized by the diaphragm surface being covered with a thin, slightly corrugated diaphragm held between a ring and a sleeve.

* * * * *